(12) United States Patent
Ray (10) Patent No.: US 8,145,244 B2
(45) Date of Patent: Mar. 27, 2012

(54) SYSTEM AND METHOD FOR DETERMINING BASE UNIT POSITION OF A CORDLESS HANDSET

(75) Inventor: Amar Nath Ray, Shawnee, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 600 days.

(21) Appl. No.: 12/256,239

(22) Filed: Oct. 22, 2008

(65) Prior Publication Data

US 2010/0099440 A1    Apr. 22, 2010

(51) Int. Cl.
*H04W 4/00* (2009.01)

(52) U.S. Cl. ..... 455/462; 455/463; 455/465; 379/29.03; 379/29.04; 379/29.07; 379/424; 379/455

(58) Field of Classification Search ............ 455/462
See application file for complete search history.

(56) References Cited

U.S. PATENT DOCUMENTS

| | | | | |
|---|---|---|---|---|
| 3,614,325 | A | * | 10/1971 | Galian et al. ............ 379/106.01 |
| 5,233,644 | A | * | 8/1993 | Yamagata et al. ............ 455/462 |
| 5,327,482 | A | * | 7/1994 | Yamamoto .................... 455/465 |
| 5,631,947 | A | * | 5/1997 | Wittstein et al. ......... 379/114.17 |
| 5,852,785 | A | * | 12/1998 | Bartholomew et al. ....... 455/561 |
| 6,934,382 | B1 | * | 8/2005 | Kunisch ........................ 379/377 |
| 2007/0049342 | A1 | * | 3/2007 | Mayer et al. .................. 455/558 |

\* cited by examiner

*Primary Examiner* — Charles Appiah
*Assistant Examiner* — Mazda Sabouri
(74) *Attorney, Agent, or Firm* — Patton Boggs LLP (57) ABSTRACT

A method and system are presented for sensing a physical position of a cordless handset with respect to a base unit. A dataset of measured line currents may be initialized. A line extension may receive a number for use in determining the position of an associated cordless handset. Stored on-base-unit and off-base-unit line currents may be accessed. A determination may be if the cordless handset is positioned on the base unit, and in response to a determination that the handset is in contact with the base unit, a desired task may proceed.

10 Claims, 12 Drawing Sheets

SYSTEM AND METHOD FOR DETERMINING BASE UNIT POSITION OF A CORDLESS HANDSET

BACKGROUND OF THE INVENTION

Telephones have existed for over a century and have proven to be an indispensable part of modern society. While telephones were initially crude devices with limited functionality, they have evolved into several varieties with increasing feature sets. One variety that has been around for years are cordless or portable phones. Rather than being limited by the length of a cord connecting a receiver to a base unit of the phone, a wireless radio transmitter communicates radio signals between the receiver and the base unit to provide freedom for the user to carry on a conversation anywhere within range of the base unit.

Cordless phones have been common for decades in the consumer market, mostly being used in residential settings. Other industries, such as hospitality and health care, have been more limited in their use of cordless phones. Cordless phones may allow a guest staying at a hotel to bring the phone to the pool, fitness center, or other area within range of the base unit in the guest's hotel room to take advantage of the facilities, while remaining in contact by phone. This enables the hotel to retain potential revenue generated by the telephone, while allowing the guests the freedom to wander within and leave their room. In addition to convenience, there are other reasons, such as safety and handicap accessibility, for wanting to provide a cordless phone to hotel guests.

A number of reasons exist, however, for the lack of acceptance of cordless phones in non-residential settings. Initial cost and potential damage to the handset are two issues. Another main issue is that cordless phones are more easily lost or stolen by the very nature of its being un-tethered from the base unit. This drives up the cost to the hotel, cruise line, hospital or other phone owner, in order to replace the missing equipment.

Similar to television remotes that only work with a specific "hotel model" of a television, cordless telephone handsets may be altered to work only with the "hotel model" of the base unit. However, guests do not always realize the handset will not work with the devices that they own at their own home, preventing this from being an effective deterrent to curb the rate at which the telephones, and the handsets in particular, are stolen or otherwise lost or misplaced.

SUMMARY OF THE INVENTION

In order to ensure a cordless telephone handset is positioned on a corresponding base unit with minimal cost and effort, the principles of the present invention provide for a cordless telephone to be configured to remotely provide status of the cordless telephone handset with respect to being at the corresponding base unit. In another embodiment, an external device, such as a PBX or server in communication with a telephone extension may be configured to provide the status of the cordless telephone handset based on measured line current. By providing the status of the handset, an owner of the telephone can be made aware of the status of the phone, to ensure the handset is not lost prior to an action such as checking out of a hotel or releasing a patient from a hospital.

One embodiment of a method for sensing a physical position of a cordless handset with respect to a base unit may include initializing a dataset of measured line currents. A line extension may receive a number for use in determining the position of an associated cordless handset. Stored on-base-unit and off-base-unit line currents may be accessed. A determination may be if the cordless handset is positioned on the base unit, and in response to a determination that the handset is in contact with the base unit, a desired task may proceed.

BRIEF DESCRIPTION OF THE DRAWINGS

The principles of the present invention is described in detail below with reference to the attached figures, wherein.

DETAILED DESCRIPTION OF THE INVENTION

The principles of the present invention provide for a cordless telephone and method for sensing an on-base unit status of a handset of the cordless telephone. The cordless telephone may be a traditional cordless phone configured to communicate over a plain old telephone system (POTS) type communication network, a Voice over IP type (VOIP) phone, or any other type of cordless telephone (i.e., a telephone that includes a cordless handset and base unit to which the handset may communicate during a telephone call and/or charges the handset). The cordless telephone additionally may operate on any number of frequencies, including but not limited to 900 MHz, 2.4 GHz, or 5.8 GHz. The description that follows is directed to one or more embodiments, and should not be construed as limiting in nature.

Figure 1A:
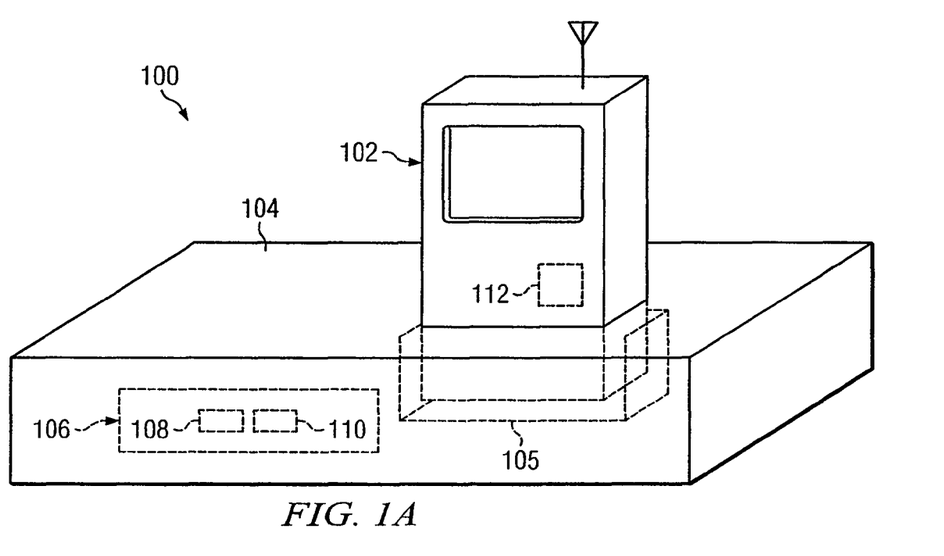
FIG. 1A is an illustration of one embodiment of a cordless telephone, including a handset and a base unit.

FIG. 1A depicts one embodiment of a cordless telephone 100 as contemplated by the principles of the present invention. The cordless phone 100 may include a handset 102 and a base unit 104. The base unit 104 may be designed so that the handset 102 is able to make continuous contact with the base unit 104 for charging the handset 102. As depicted in FIG. 1A, the handset 102 sits upon the base unit 104 in a cradle 105. It is to be understood that the cradle 105 does not have to be within the base unit 104, but may be in any arrangement that allows the handset 102 and the base unit 104 to be in contact to charge a batter (not shown) in the cordless handset. This contact position may be referred to as the "on-base unit" position. When the handset 102 is in the on-base unit position, the phone recharges the battery located inside the handset 102. The cordless phone 100 is typically in an on-hook position (i.e., not in a communication mode) when it is in the on-base unit position. Likewise, the cordless phone 100 may either be in the on-hook or off-hook position when it is not in the on-base unit position. The distinction between being on-base unit/off-base unit (i.e., handset in contact with base unit) and on-hook/off-hook (i.e., in communication or dialing mode) should be recognized and considered different for the purposes of this description. More particularly, rather than detecting if a phone line is in use or not in use (referred to as on-hook or off-hook respectively), being on-base unit or off-base unit is determined by detecting whether or not the handset 102 is physically placed in contact with the base unit 104, which is not equivalent to the on-hook/off-hook determination.

The base unit 104 may additionally include an input/output (I/O) unit 106 including two I/O circuits 108 and 110. The first I/O circuit 108 may be configured to communicate communications signals with a communications network. The communications network may be a traditional POTS network, IP network, or any type of network in which the telephone is configured to operate. The second I/O circuit 110 may be configured to wirelessly communicate communications signals between the base unit 104 and the cordless handset 102. Additionally, the second I/O circuit 110 in this embodiment may operate with radio signals at numerous frequencies. Some typical frequencies are 900 MHz, 2.4 GHz, or 5.8 GHz, but depending on the type and model of the phone, the frequencies may be otherwise. Within the handset 102, there may be a third I/O circuit 112 for communicating with the I/O circuit 110 on the base unit 104.

Figure 1B:
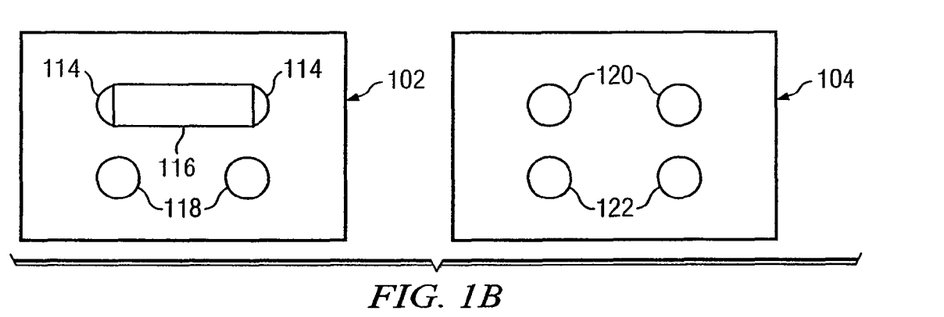
FIG. 1B is an illustration of one embodiment of conductors located on a handset and corresponding base unit.

FIG. 1B depicts conductors located on the base unit 104 and the handset 102. Two pairs of conductors 114, 118 and 120, 122 may be located on the handset 102 and base unit 104, respectively, as shown. It is anticipated that any number of conductors is possible, and the two pair embodiment should not be construed as limiting the disclosure. The pairs of conductors 114 and 118 may be located on the cordless handset 102, and the pairs of conductors 120 and 122 may be located on the base unit 104 in such a configuration that the pairs of conductors contact one another when the cordless handset 102 is placed on the base unit 104. In this embodiment, a conducting strip 116 is placed in contact with the top pair of the conductors 114 of the cordless handset 102. The conducting strip 116 may provide for a connection to be made between the pair of conductors 114 on the base unit 104 and will be described in greater detail below in reference to FIG. 3. It should be understood that the use of a conducting strip is exemplary and that other configurations to connect the conductors 114 or 120 may be utilized.

Figure 2:
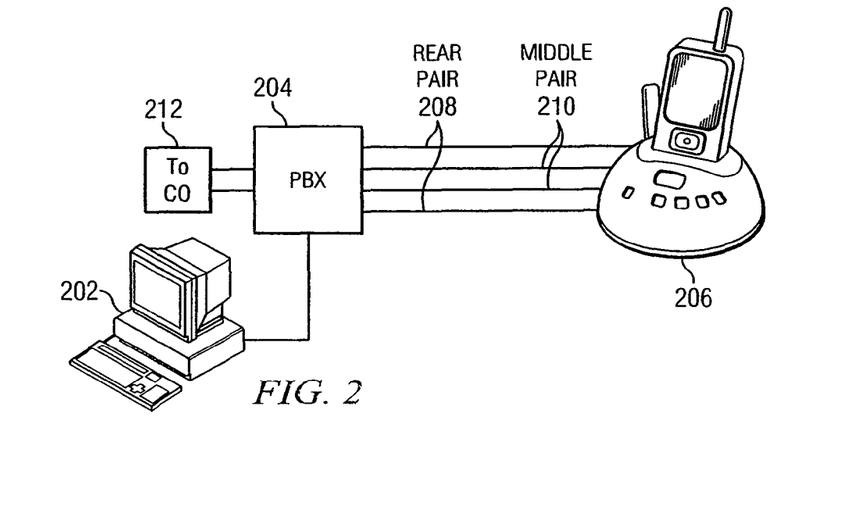
FIG. 2 is an illustration of a typical configuration of network services being delivered to a telephone through a local private branch exchange (PBX)

FIG. 2 depicts one embodiment of a telephone network 200 as contemplated by the present invention. The cordless telephone 206 may be connected by a four-wire copper loop to a local switch or PBX 204. The PBX 204 may be connected to a computing device 202, such as a point-of-service system in a hotel for checking guests in and out, or any other type of computing device capable of connecting to the PBX 204. The PBX 204 may additionally be connected to a Central Office (CO) 212 for providing communications to the PBX 204. The connection between the PBX 204 and the CO 212 may be copper, cable, fiber, or any other type of connection capable of communicating between the CO 212 and the PBX 204. Additionally, the connection between the PBX 204 and the telephone is not limited to a four-wire copper loop. Any type of network for providing communications between a local switch or PBX 204 and a telephone 206 is also contemplated. For example, if the telephone 206 is a WiFi or VoIP phone, the communications network between the PBX 204 and the cordless phone 206 may be Ethernet.

The four-wire copper loop connection as depicted in FIG. 2 includes a rear pair 208 and a middle pair 210. As understood in the art, the middle pair 210 may be used for connecting a single-line telephone set and the rear pair 208 may be used for a second line connection or may be unused. These wires may be connected to an RJ-11 phone jack (not shown) into which the cordless telephone 206 connects to enable the telephone to connect to the communications network. When the rear pair 208 is not in use, the rear two pins on the RJ-11 jack remain open, thereby providing an infinite resistance in the loop, and causing no current to flow through the wires or pins of the rear pair 208, as understood in the art. In one embodiment, the cordless telephone base unit generates a digital signal (e.g., "1" or "0") representative of an on-base unit and off-base unit state over a communications network in the case of a digital phone system, rather than different current levels, as would be done in an analog phone system.

Figure 3A:
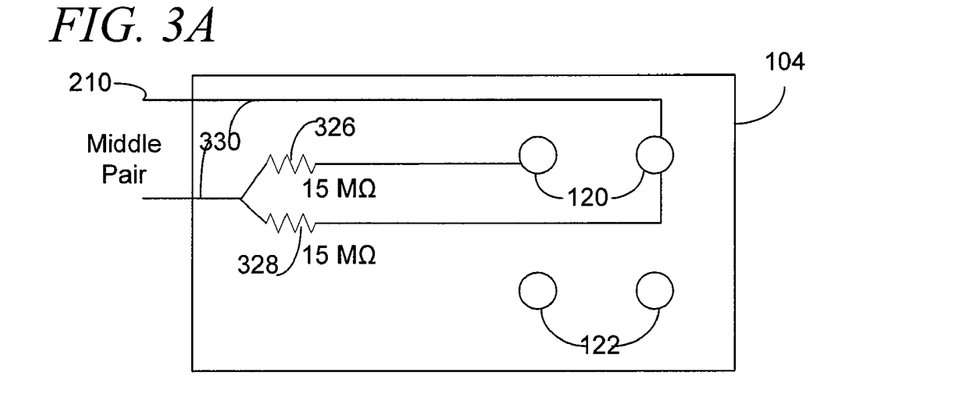
FIG. 3A is an electrical schematic diagram of one embodiment of a base unit.

FIG. 3A is an electrical schematic diagram of an alternative embodiment of a base unit, such as base unit 104. The conductors 120 and 122 are located at the base unit 104. One pair of the conductors 122 may be used for charging the cordless handset 102 when the cordless handset 102 is in contact with the base unit 104 (i.e., on base-unit). The other pair of conductors 120 may be connected to the middle pair 330 of a 4-wire copper loop. Using the middle pair allows for the rear pair (not shown) to be used for another RJ-11 jack or to remain unused. By connecting the middle pair 330 to the conductors 120, electrical current in the line may be detected in order to determine if the cordless handset 102 is in an on-base unit position.

In this embodiment, two 15 MΩ resistors 326 and 328 are shown. When the cordless handset 102 is not in contact with the base unit 104, the total dc on-base unit resistance of the telephone is 15 MΩ, as would be understood by one normally skilled in the art. When the cordless handset 102 is placed in contact with the base unit 104, the conducting pair 120 is connected to the conducting strip 116 and the conductors 114 from the handset, which causes resistor 326 to become part of the circuit, thereby causing the equivalent resistance of the telephone set to go down by half and the on-base unit electrical current to go up by double. This change of electrical current in the middle pair 330 may allow computing device 202 (FIG. 2) to detect that the cordless handset 102 is in contact with the base unit 104.

Figure 3B:
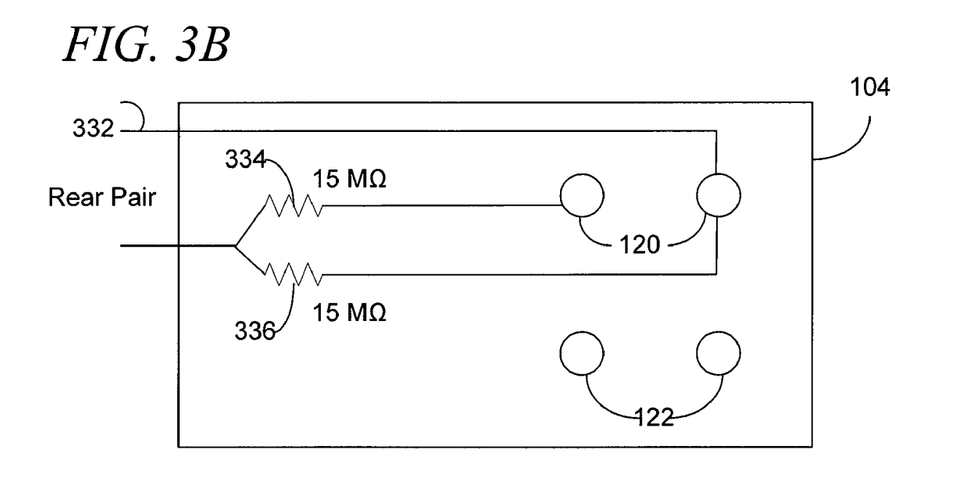
FIG. 3B is an alternative embodiment of a wiring schematic of the base unit.

One issue to note about using the middle pair 330 is that the change in on-hook resistance and current is similar to that which occurs when connecting a second phone in parallel with a first phone. For this reason, a second embodiment may be considered if the rear pair 208 (FIG. 2) is available for use. FIG. 3B is an electrical schematic diagram of a second exemplary embodiment as contemplated by the principles of the present invention. As before, there are two 15 MΩ resistors 334 and 336 that are shown, but in this embodiment, a rear pair 332 are connected to the base unit. As before, one pair of contacts 122 may be used for battery charging. The rear pair 332 is connected with the conductors 120 through the parallel configuration of the two resistors 334 and 336. The rear loop sees only one of the 15 MΩ resistors (i.e., resistor 336) when the cordless handset 102 is not in contact with the conductors 120. When contact is made between the base unit 102 and the handset 104, the dc resistance drops to half of its original value (i.e., 7.5 MΩ), thereby causing a doubling of the on-base unit current. This change of on-base unit current may be detected by the computerized system 202 (FIG. 2) connected to the PBX or switch 204 providing for detection of the position of the cordless handset 102. Although shown as using 15 MΩ resistors, alternative resistor values and electrical circuit configurations may be utilized.

Figure 3C:
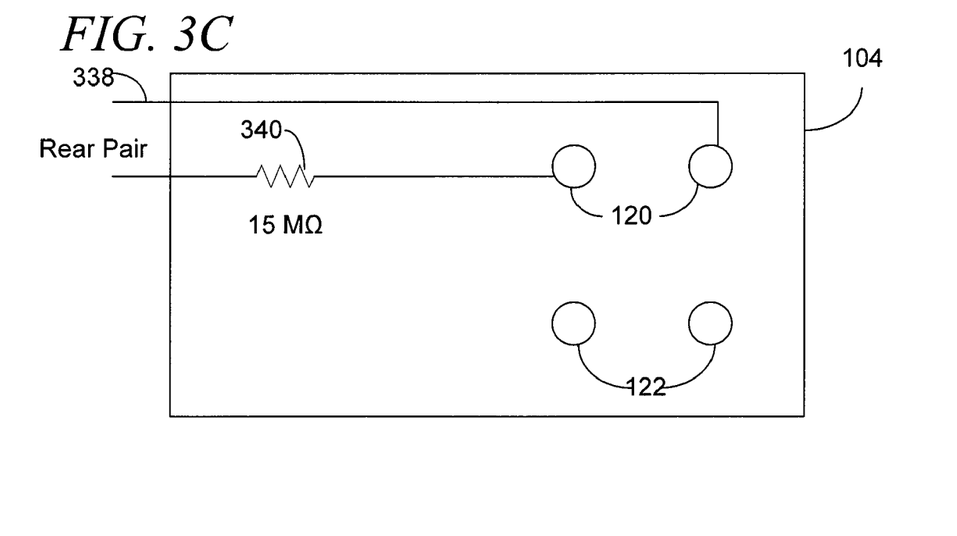
FIG. 3C is an electrical schematic diagram of an alternative embodiment of a wiring schematic of the base unit.

FIG. 3C is an electrical schematic diagram of a third exemplary embodiment, where a rear pair 338 is connected, as in FIG. 3B, to the base unit 104. However, only one 15 MΩ resistor is provided in this embodiment. When there is no contact between the handset 102 and the base unit 104, there is no electrical current flowing through the rear pair 338 due to an open circuit existing between conductors 120. A change in electrical current may be detected by the computing device 202 when the handset 102 is placed into contact with the base unit 104 in that resistor 340 becomes connected as the teat pair 338 forms a loop due to the handset 102 completing the circuit between conductors 120. While this embodiment uses only one resistor 340 rather than two (see FIGS. 3A and 3B), there may be a problem in detection of the change of on-base unit electrical current by creating a condition known as idle start. Idle start can also cause problems from some older PBX/switches.

Figure 4:
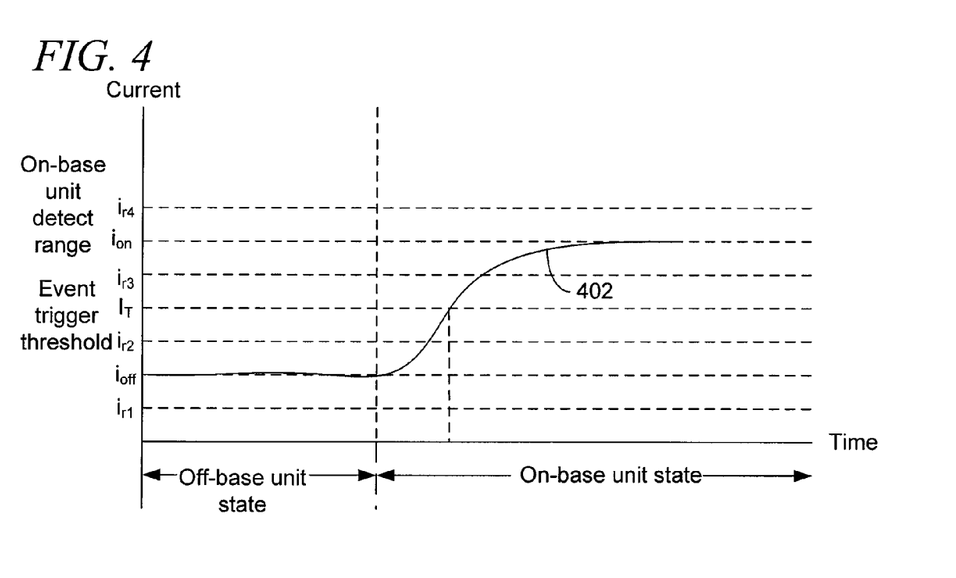
FIG. 4 is a signal diagram depicting an electrical current measured over time as the cordless handset is being placed on the base unit.

FIG. 4 is a signal diagram 400 depicting an electrical current 402 that may be measured over time as the cordless handset 102 is being placed on the base unit 104. The x-axis represents time, while the Y axis represents measured current level. In this figure, the electrical current 402 is being used for the purposes of determining whether the handset is on-base unit or off-base unit. However, voltage may also or alternatively be measured. For example, rather than the current 402 rising when the cordless handset 104 is placed on the base-unit 102 (as depicted in 400), the voltage would drop when the cordless handset 104 is placed on the base-unit 103 to be in an on-base unit position.

Using either a measurement of voltage or current, the on-base/off-base unit determination may be made by performing electrical current or voltage range detection or threshold detection. For electrical current or voltage range detection, the determination may be made that the cordless handset 102 is in the off-base unit position whenever the electrical current range is between $i_{r1}$ and $i_{r2}$. The determination may be made that the cordless handset is located in the on-base unit position when the current is in between $i_{r3}$ and $i_{r4}$. For threshold detection, a current threshold level $I_T$ may be monitored such that whenever the current passes $I_T$, (a threshold level), a status bit may change to indicate the present on-base/off-base unit position.

It should be noted that the measurement may be analog or digital. The current may be measured at PBX (FIG. 2, 204), where the current level would be analog on a traditional POTS type network. However, the current 402 may also be measured by a sensor in the base unit itself. In the event that the base unit is a digital telephone operating over Ethernet (for example a VoIP type phone), the measurement may be taken by a sensor (not shown) at the base unit that returns a bit (i.e. 0 or 1) representing the base-unit status.

Figure 5:
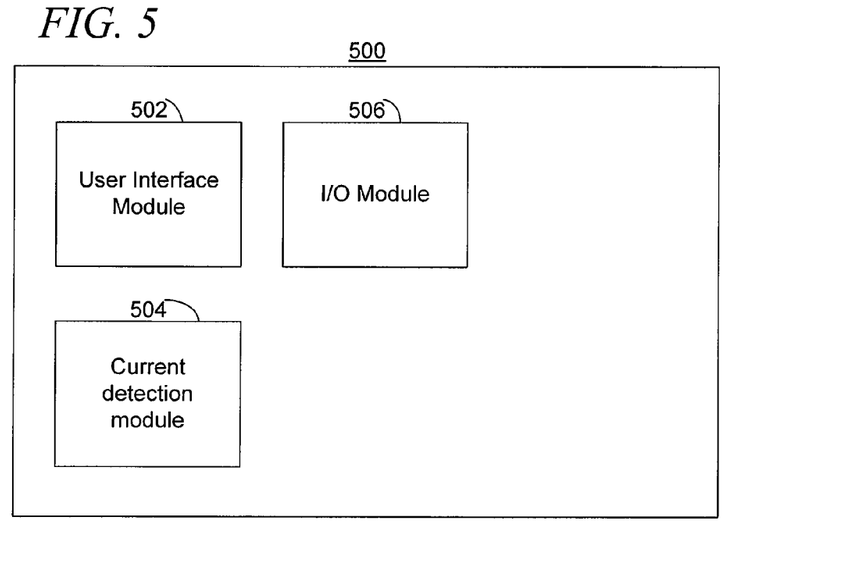
FIG. 5 is an illustration of one embodiment of software modules executed by a processing unit of the telephone of FIG. 1A.

FIG. 5 is an illustration of one embodiment of software modules 500 that may be executed in the computing system 202 and/or PBX for performing functions in accordance with the principles of the present invention. The software modules 500 may include a user interface module 502, current detection module 504, and I/O module 506. Either a PBX 204 (FIG. 2) or an adapter (not shown) may convert the communications signal from the cordless telephone from an analog into a digital format as input into the computing system 202. The input/output (I/O) module 506 may be configured to accept as an input a measurement of the electrical current from the cordless telephone system as sent from the PBX 204 or the adapter. The current detection module 504 may communicate with the I/O module 506 in receiving the measured electrical current. Alternatively, the I/O module 506 may process the on-base unit signal without the use of the current detection module 504. The use of the I/O module 506 without the use of the current detection module 504 may be relevant in situations where the on-base unit signal is not based on the electrical current, but another type of signal. Additionally, the user interface module 502 may also provide a Graphical User Interface (GUI) or inputs to a GUI for customer services, such as the ability to check out a guest from a hotel or a patient from a hospital. The software modules 500 may include other software modules, fewer software modules, or software modules in combination depending upon the particular configuration of the communications network.

Figure 6:
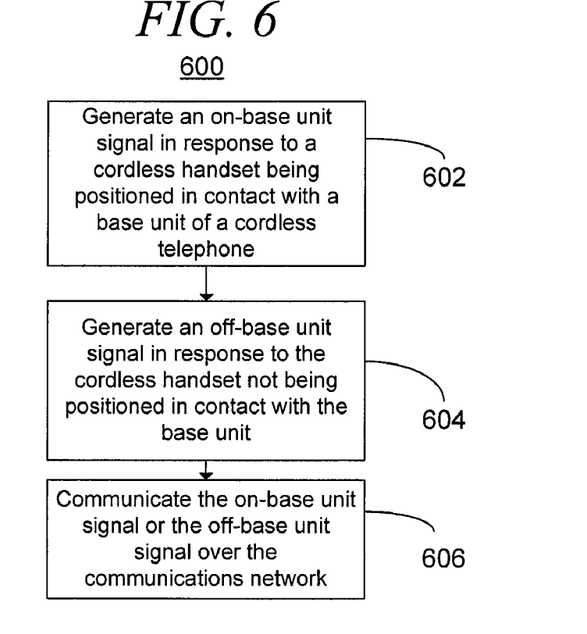
FIG. 6 is a flow chart of one embodiment of a process for providing an on-base unit status from a cordless telephone in accordance with the principles of the present invention.

FIG. 6 is a flow chart of one embodiment of a method 600 for providing on-base unit status from a cordless telephone. In one embodiment, an on-base unit signal may be generated in response to a cordless handset being positioned in contact with a base unit of a cordless telephone in step 602. This may be the telecommunications signal as found on a POTS type network or any other type of signal compatible to operate on the network in which the telephone is configured to operate (e.g. digital over Ethernet). An off-base unit signal may be generated in response to the cordless handset not being positioned in contact with the base unit at step 604. Depending on whether the cordless handset 102 is being placed on the base unit 104 or being removed from the base unit 104, the on-base unit or off-base unit signal (respectively) is then communicated over the communications network in step 606.

Figure 7:
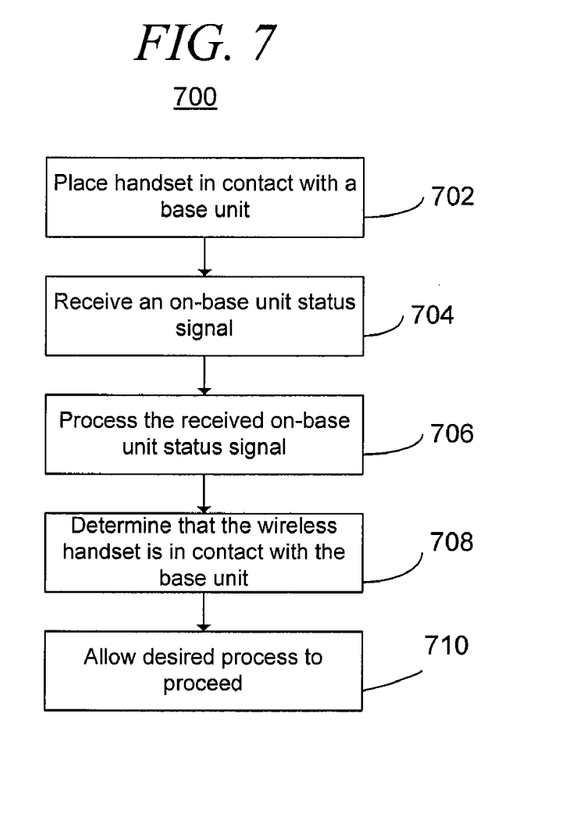
FIG. 7 is a flow chart of one embodiment of a process for sensing a physical position of a cordless handset with respect to a base unit in accordance with the principles of the present invention.

FIG. 7 is a flowchart of one embodiment of a method 700 for sensing a physical position of a cordless handset with respect to a base unit. The method is initiated by placing a handset in contact with a base unit in step 702. Next, an on-base unit status signal may be received in step 704. The received on-base unit status signal may then be processed in step 706. The determination may then be made that the cordless handset is in contact with the base unit in step 708. Finally, the determination is used to allow a desired process to proceed in step 710. An example of a process that is determinant on the on-base unit signal is whether or not a guest may check out of a hotel. The principles of the present invention may be used for nearly any hospitality, hospital, or other commercial or consumer applications.

Figure 8:
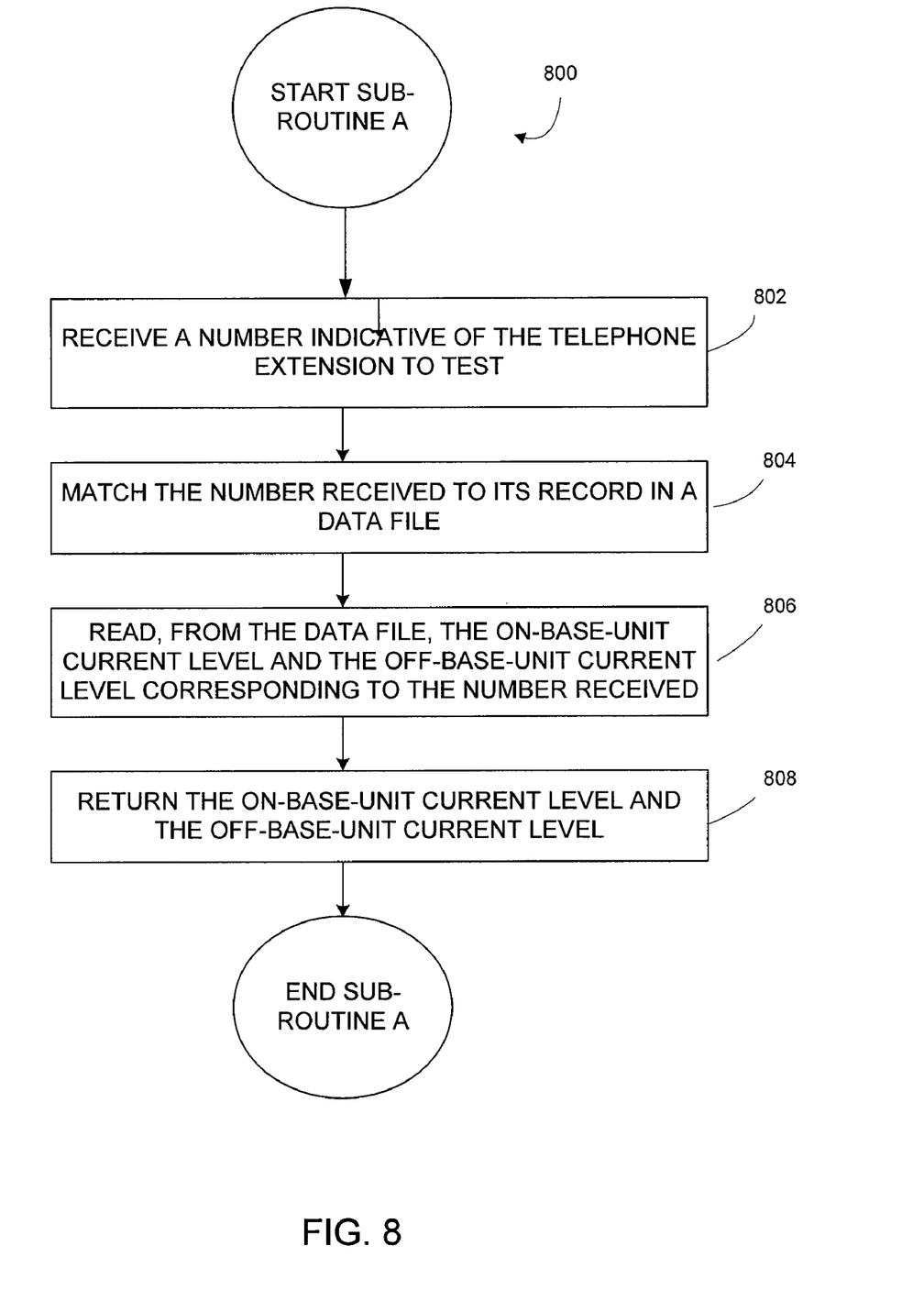
FIG. 8 is a flow chart of one embodiment of a process for determining on-base-unit and off-base-unit current levels for a specific telephone extension.

FIG. 8 is a flowchart of one embodiment of a process 800 for determining on-base-unit and off-base-unit current levels for a specific telephone extension. The process 800 may be provided by software executed on a computing system capable of communicating with a datafile storing Table 1. For example, the computing system may be configured to operate a front desk of a hotel or hospital.

At step 802, a number indicative of the specific telephone extension to test may be received. The number may be a full 10-digit telephone number, a local 5-digit extension, or any combination of numbers or letters specifying the particular extension to be tested. In step 804, the number received may be matched to its record in a data file. The data file may be created separately from, or prior to, a user running individual tests of the various telephone extensions. The data in the data file may be generated may manual testing occurring at one time and being stored, or an automated system for creating the test data may be used. The data file may include a primary key, such as a room number, in addition to a value representative of the line current when a handset is placed on a base unit and another current level value indicative of the handset not being placed on the base unit. Table 1 shows one embodiment of a data file as previously described.

TABLE 1

| ROOM NUMBER | Imin | Imax |
| --- | --- | --- |
| 101 | 400 micro amps | 800 micro amps |
| 102 | 405 micro amps | 810 micro amps |
| 103 | 410 micro amps | 820 micro amps |
| 104 | 415 micro amps | 830 micro amps |
| 105 | 410 micro amps | 820 micro amps |
| . . . | ### micro amps | 2 × ### micro amps |

Based on information stored in the table, it can be shown that the on-base-unit current level (Imax) is generally double the aft-base-unit current level (Imin). Also, variations from room to room (or extension) may be present.

In step 806, the on-base-unit current level and the off-base-unit current level corresponding to the number received may be read from the datafile. In step 808, the on-base-unit current level and the off-base-unit current level may then be returned to a calling process for use in further calculations.

Figure 9:
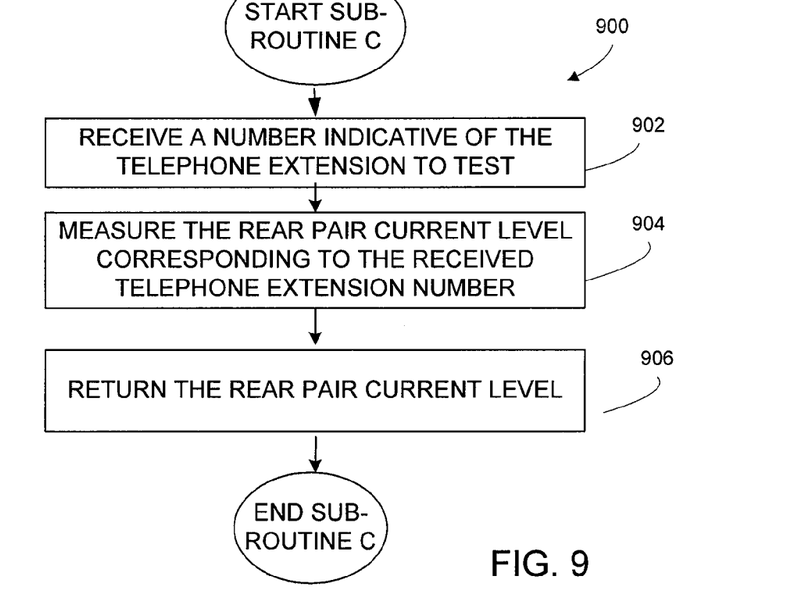
FIG. 9 is a flow chart of one embodiment of a process for determining a rear pair current level corresponding to a telephone extension.

FIG. 9 is a flowchart of one embodiment of a process 900 for determining a rear pair current level corresponding to the rear pair of a telephone extension. The process 900 may be provided by software or hardware executed by a system in communicated with telephones configured with resistor pairs. In step 902, a number indicative of the telephone extension to test may be received. In step 904, the rear pair current level corresponding to a received telephone line extension number may be measured. In this embodiment, the rear pair is referring to the rear pair of a four wire copper loop typically used in a telecommunications network, as is known by one with ordinary skill in the art and previously described. In many hospitality applications, the rear pair would not normally be used unless a second telephone or another extension is using them. In step 906, the measured rear pair current level may be returned to a calling application.

Figure 10:
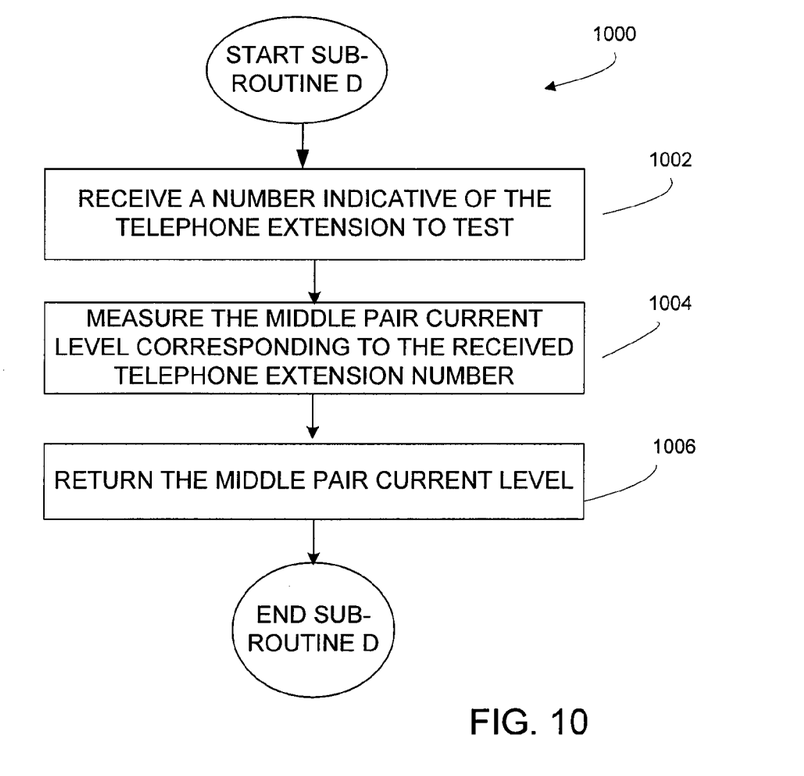
FIG. 10 is a flow chart of one embodiment of a process for determining a middle pair current level corresponding to a telephone extension.

FIG. 10 is a flowchart of one embodiment of a process 1000 for determining a middle pair current level corresponding to a telephone line extension number. In step 1002, the number indicative of the telephone line extension number to be tested may be received. In step 1004, the middle pair current level corresponding to the received telephone line extension number may be measured. The middle pair, as previously described, is typically used in four wire loop applications as the primary communication lines. However the middle pair may be used for testing line current in certain circumstances. In step 1006, the middle pair current level may be returned to the calling application. One embodiment for using either the rear pair or middle pair line current level for the purposes of testing on-base-unit positioning involves the use of a table, in this embodiment, that has been accurately created to reflect the various current levels when the cordless handset is both on and off base unit.

Figure 11:
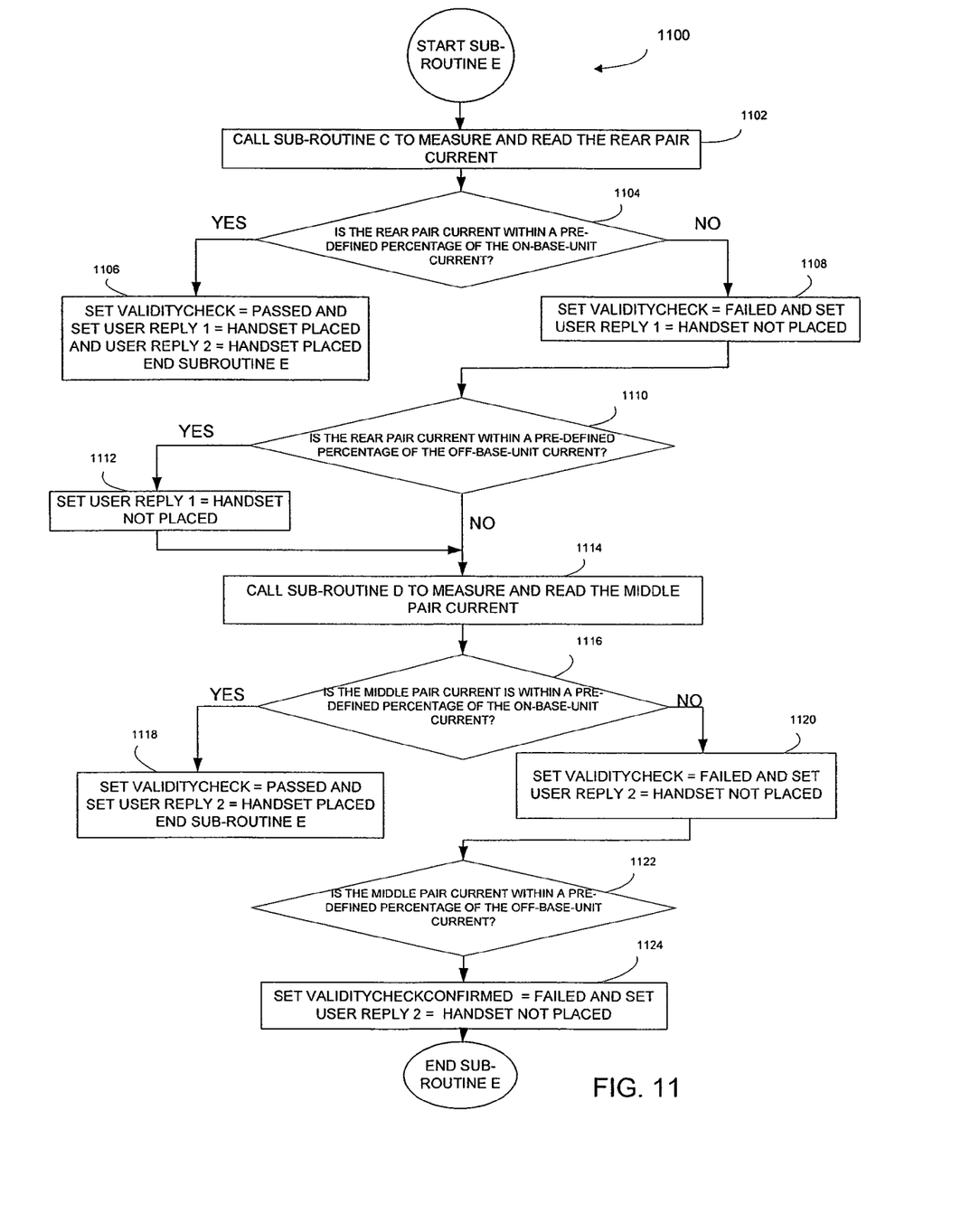
FIG. 11 is a flow chart of one embodiment of a process for determining the on-base-unit status for a handset.

FIG. 11 is a flowchart of one embodiment of a process 1100 for determining the on-base-unit status for a handset. In step 1102, the method described in FIG. 9 is used to measure and read the rear pair current. In step 1104, a determination is made as to whether the rear pair current is within a predefined percentage of the on-base-unit current. In an alternative embodiment, rather than a percentage, a range, offset, or similar method may be used. If the rear pair current is within a predefined percentage of the on-base-unit current, in step 1106 a flag may be set to indicate that the handset is placed and the process may return to the previous process.

If the rear pair current is not within a predefined range of on-base-unit current, a flag or some other variable may be set to indicate that the handset is not placed in step 1108. A determination may be made in step 1110 as to whether the rear pair current is within a predefined percentage of the off-base-unit current. If the rear pair current is within a predefined percentage of the off-base-unit current, in step 1112 a flag may be set to indicate that the handset is not placed.

In step 1114, the process of FIG. 10 may be used to measure and read the middle pair current. A determination may be made in step 1116 as to whether the middle pair current is within a predefined percentage of the on-base-unit current. In an alternative embodiment, rather than a percentage, a range, offset, or similar method may be used. If the middle pair current is within a predefined percentage of the on-base-unit current, in step 1118 a flag may be set to indicate that the handset is placed on the base unit. If the middle pair current is not within the predefined percentage of the on-base-unit current, a flag may be set to indicate that the handset is not placed in step 1123. In step 1122, a determination may be made whether the middle pair current is within a predefined percentage of the off-base-unit current, indicating that the handset is not placed on the base unit. If the middle pair current is within a predefined percentage of the off-base-unit current, in step 1124 a flag may be set to indicate that the handset is not placed and the process may end.

Figure 12:
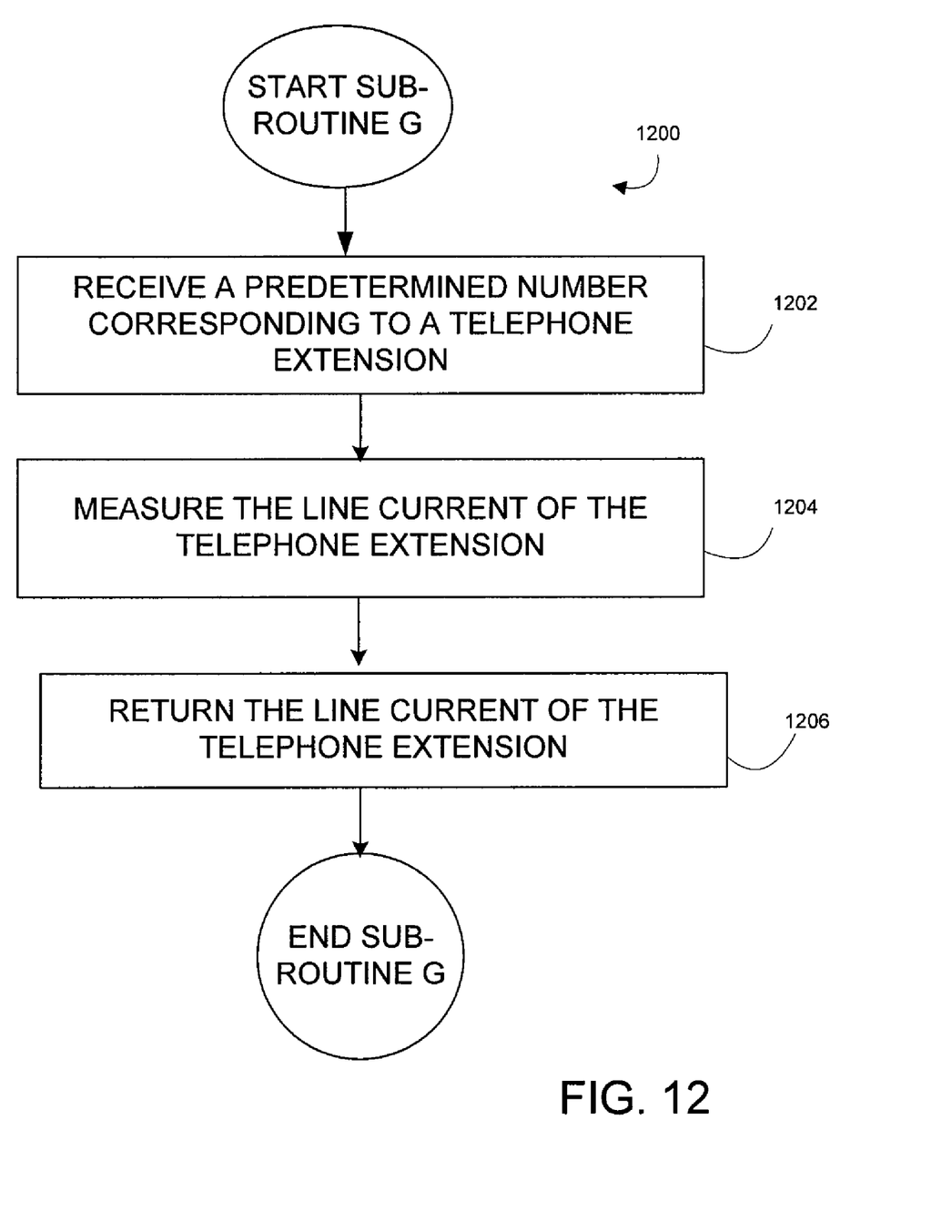
FIG. 12 is a flow chart of one embodiment of a process for determining if a telephone line is answered.

FIG. 12 is a flowchart of one embodiment of a process 1200 for determining if a telephone line has been answered (i.e., gone off-hook). In step 1202, a predetermined number may be received. As indicated previously, the predetermined number may represent a hotel room, hospital room, or a similar telephone line extension number in which the line current is desired to be measured. In step 1204, the line current of the predetermined number may be measured. Determining line current may be used here to determine whether or not a phone extension is on-hook or off-hook, indicating that a person on the other end has answered a call. In step 1206, the line current of the predetermined number may be returned.

Figure 13:
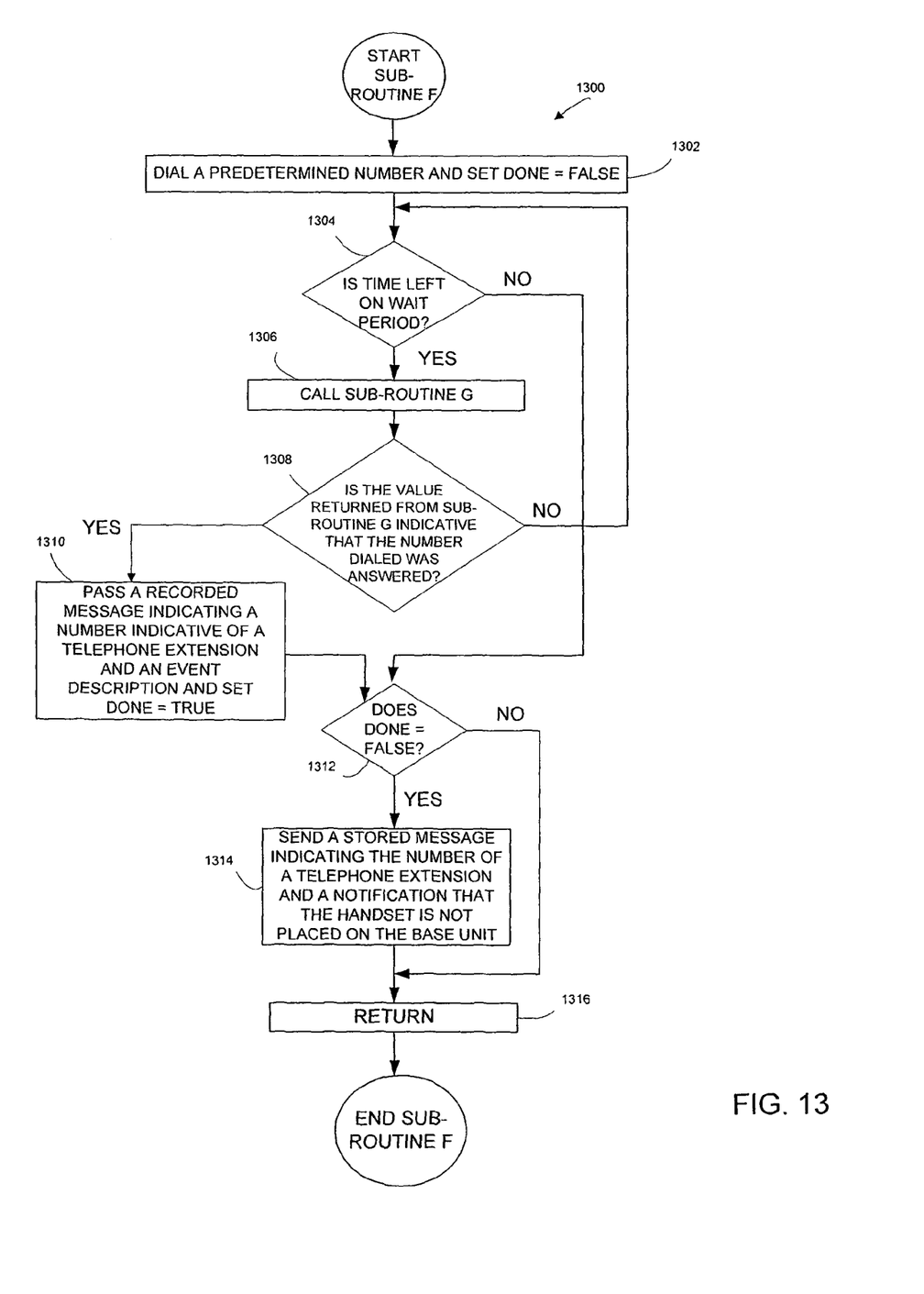
FIG. 13 is a flow chart of one embodiment of a process for providing notification of a handset being positioned off of the base unit.

FIG. 13 is a flowchart of one embodiment of a process 1300 for providing notification of a handset being positioned off the base unit. In step 1302, a predetermined number may be dialed and a flag set to indicate that the process is not complete. The predetermined number in this embodiment, may represent a telephone extension of a maintenance worker or other employee or similar person who may have access to the previously mentioned handset and base unit. The predetermined unit may also be related to a contact number of a person to whom notification is to be provided.

In step 1304, a determination may be made as to whether the current process should be continued. If it is determined that the current process should be continued, in step 1306 the process described in FIG. 12 may be called for determining if a phone line is answered. If the process for determining that the phone line was answered indicates that the number was answered, a message may be passed in step 1310 to indicate that the telephone extension was answered. The message may be a recorded message, text message, or any other indication that a user may be able to recognize what line extension needs to be evaluated. If there is no time left for the process, attempts to determine if the telephone line has been answered may cease at step 1304. At step 1312, a determination is made as to whether the flag indicates that the telephone has not been answered. If the telephone has not been answered, at step 1314 a stored text message or other communication such as voicemail, instant message, e-mail, or similar message, may be sent to and addressed to indicate that the handset was not placed, as well as giving the extension for the handset that was not placed. In step 1316, the process may return to process which called the notification process.

Figure 14:
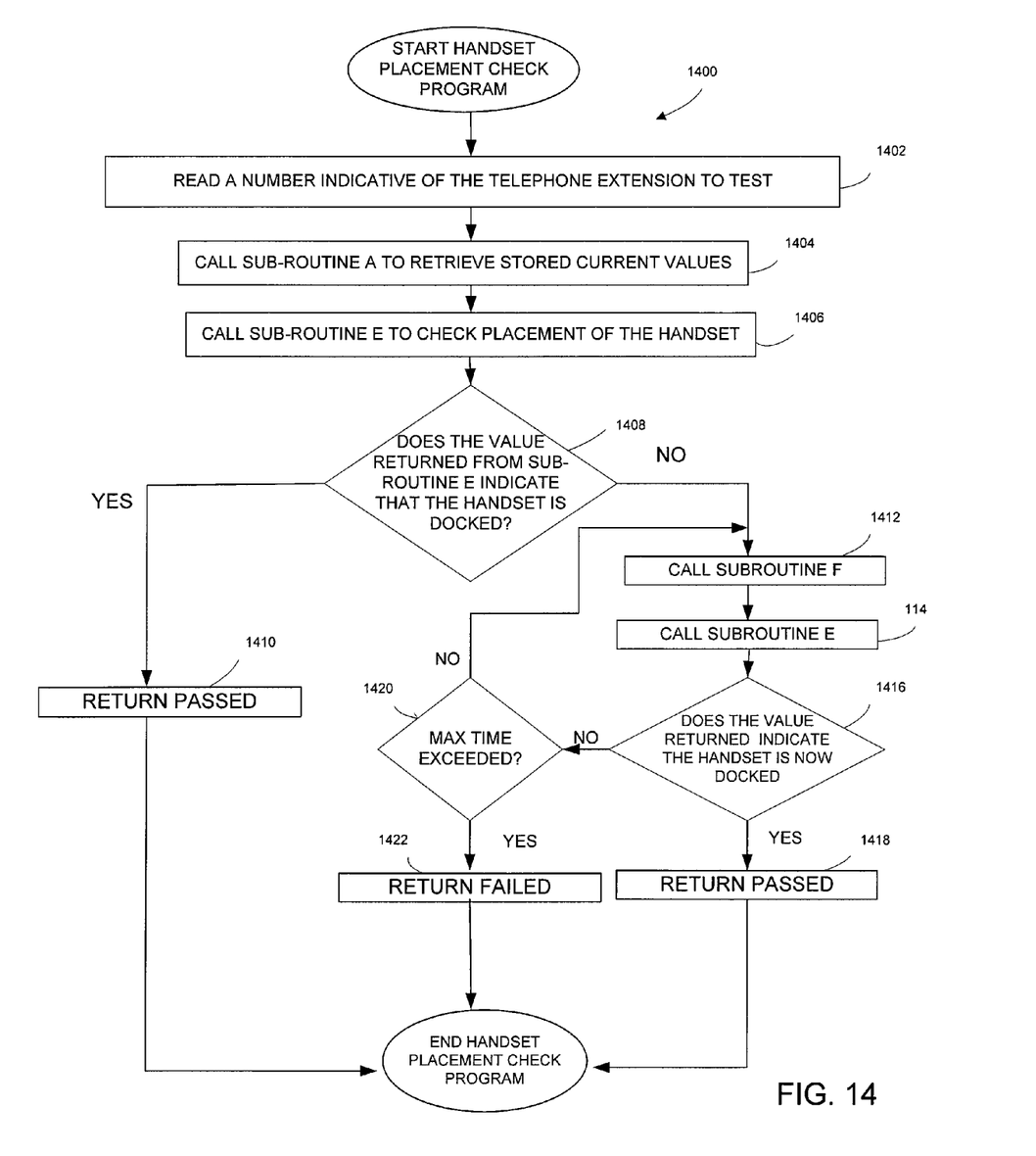
FIG. 14 is a flow chart of one embodiment of a process for determining whether a particular handset is placed on a base unit.

FIG. 14 is a flowchart of one embodiment of a process 1400 for determining whether a particular handset is placed on a base unit. In step 1402, a number indicative of the telephone extension to be tested may be read. This number may also be entered by an operator or other user, by reading an input file, or any other method in which the number indicative of the telephone extension to be test may be read or otherwise inputted. In step 1404, the process described above in FIG. 8 may be used to retrieve values that are currently stored for the particular current levels of the indicated telephone extension to be tested. In step 1406, the process described in FIG. 11 to check the placement of the handset may be used. In step 1408, a determination may be made as to whether the value returned from the process described in FIG. 11 indicates that the handset is docked.

If the process described in FIG. 11 indicates that the handset is docked, a return value may be sent to indicate that the handset is docked and the process ends. If the process from FIG. 11 indicates that the handset is not docked, the process described in FIG. 13 may be performed at step 1412. At step 1414, the process described in FIG. 11 may then be performed. At step 1416, a determination may be made as to whether or not the process of FIG. 11 indicates that the handset is now docked. If the process indicates that the handset is now docked, at step 1418, a value indicating that the handset is now docked may be returned to the calling process. If the value indicates that the handset is not now docked from the determination made in step 1416, a separate determination as to whether time is expired may be made at step 1420. If the time has not expired, steps 1412, 1414, and 1416 may be repeated. At step 1416, another determination may be made as to whether the handset is now currently docked, and if the handset is still not currently docked, the time may again be checked in step 1420. If the time has exceeded, in step 1422, a value indicating that the handset is still not docked may be returned to the calling program and this process exited.

Figure 15:
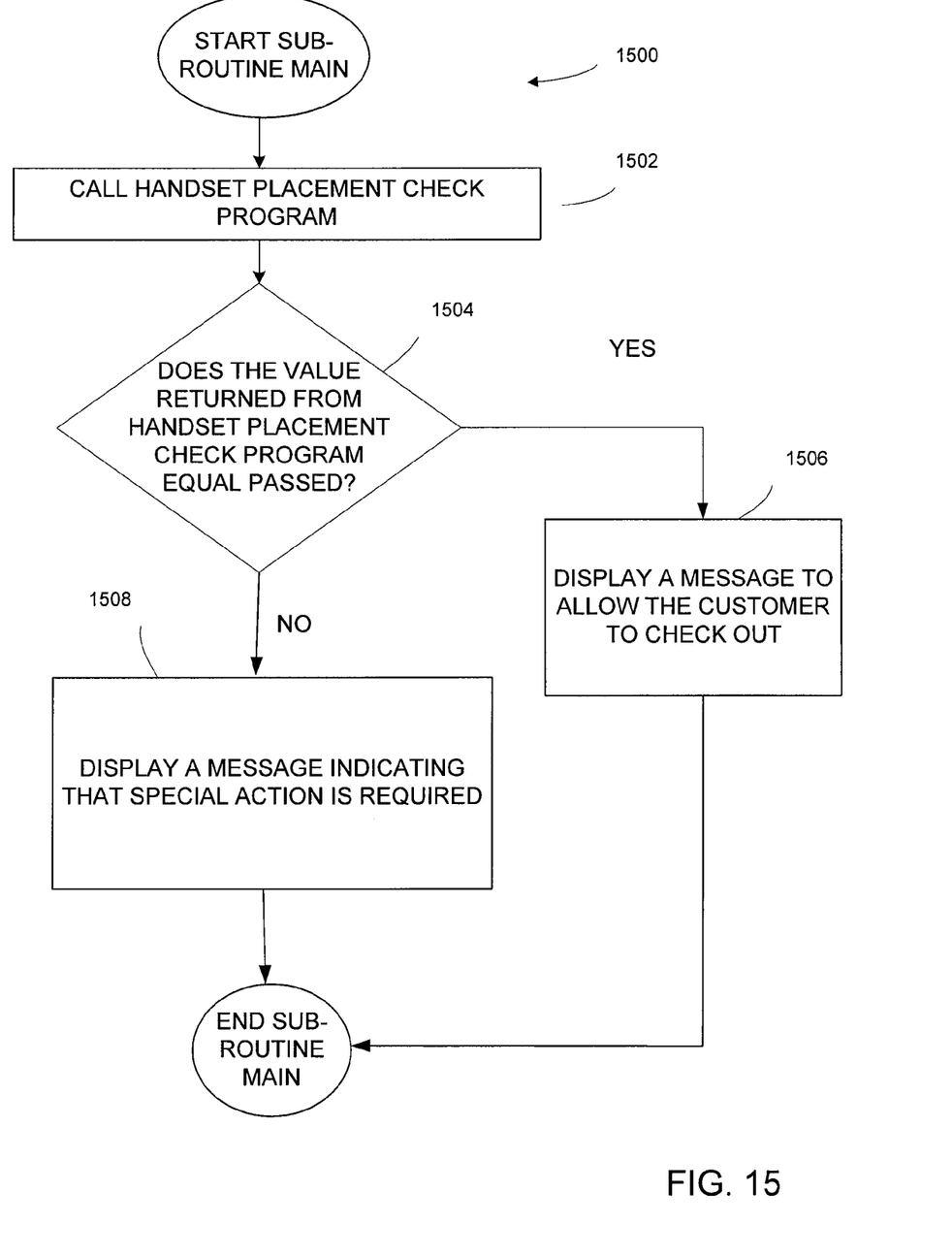
FIG. 15 is a flow chart of one embodiment of a process for determining whether a customer can check out from a hospitality entity, based on a particular handset being placed on a base unit.

FIG. 15 is a flowchart of one embodiment of a process 1500 for determining whether a customer can check-out from a hospitality entity, based on a particular handset being placed on a base unit. In step 1502, the process described in FIG. 14 above, may be performed. A determination may be made in step 1504 as to whether the value returned from the process described in FIG. 14 indicates that the handset has been placed on the base unit. If the handset is placed on the base unit, in step 1506 a message may be displayed to allow the customer to check-out. If the value indicates that the handset is not placed, in step 1508 another message may be displayed indicating that special action may be required before the customer is allowed to check out.

Figure 16:
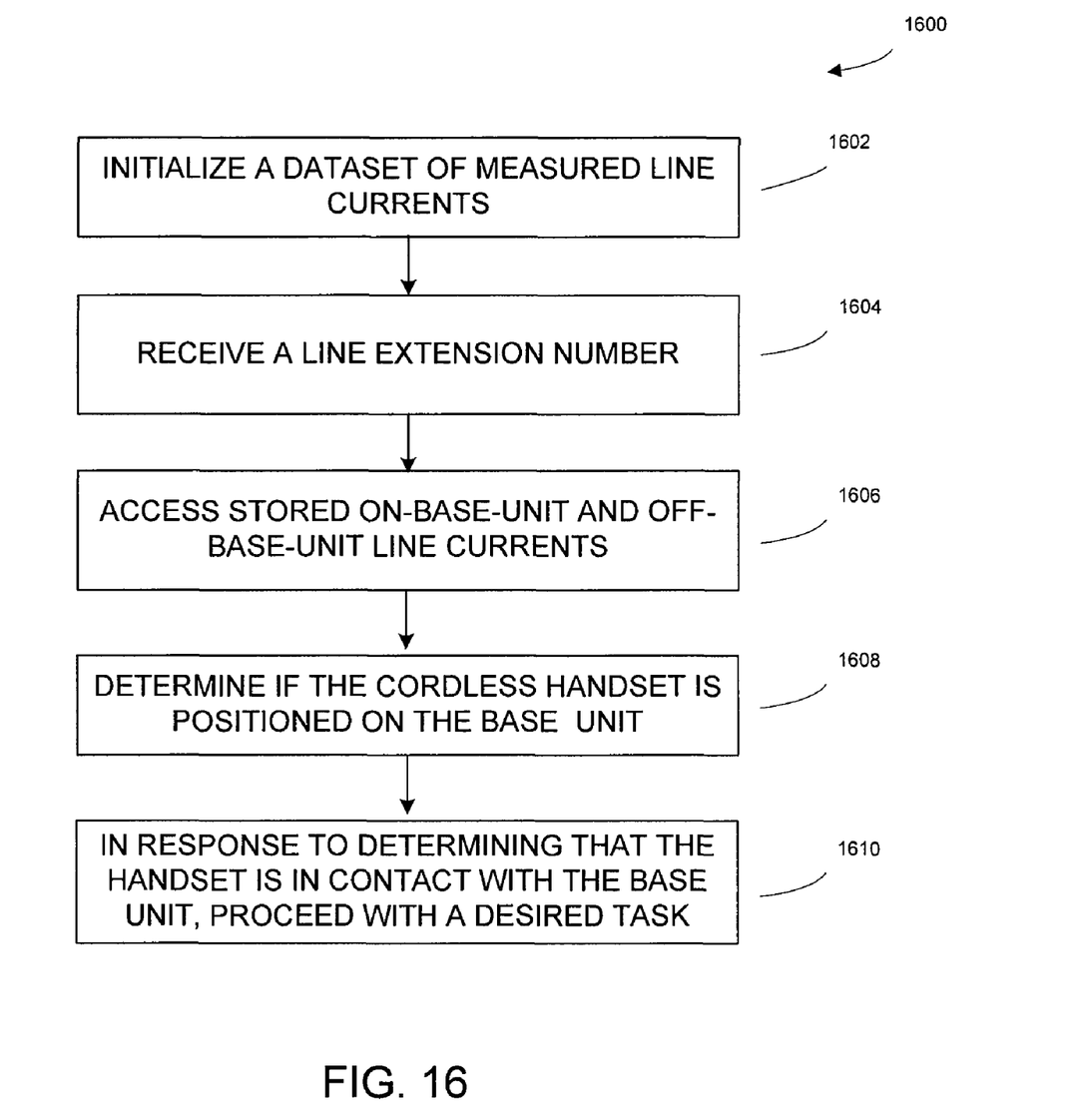
FIG. 16 is a flowchart of an additional embodiment of a method for determining the position of a cordless handset.

FIG. 16 is a flowchart of an additional embodiment of a method 1600 for determining the position of a cordless handset. In step 1602, a dataset of measured line currents may be initialized. The dataset may be stored in a table, file, database or some other storage medium configured to store data. The line currents may represent the on-base-unit and off-base-unit line currents corresponding to a telephone line extension in a hotel room, hospital, or any other location where a cordless handset may be used. In step 1604, a line extension number may be received for use in determining the position of an associated cordless handset. The line extension number may be entered by a computing device, telephonic device, or any other method configured to provide input. Stored on-base-unit and off-base-unit line currents may be accessed in step 1606. Accessing the stored on-base-unit and off-base-unit currents allows for a comparison to be done with the present line current for the line extension number received. In step 1608, a determination may be made using the accessed stored on-base-unit and off-base-unit values and a measured line current, as previously described to determine if the cordless handset is positioned on the base unit. Depending upon the comparative value of the stored and measured line currents, the position may be determined. In response to determining that the handset is in contact with the base unit, in step 1610, a desired task may proceed. In one embodiment the desired task may be to allow a user to check out of a hotel or hospital room. The knowledge of the base-unit status may be used for a variety of other tasks.

The previous description is of at least one embodiment for implementing the invention, and the scope of the invention should not necessarily be limited by this description. The scope of the present invention is instead defined by the following claims.

The invention claimed is:

1. A method for sensing a physical position of a cordless handset with respect to a base unit, the method executed by a device in communication with the base unit over a communication network, the base unit connected to the communication network via a communication line, the method comprising:

initializing a dataset of measured line currents, the dataset of measured line currents comprising line current measurements generated by measuring a current flow through the communication line connecting the base unit to the communication network;

receiving a line extension number for use in determining the position of an associated cordless handset;

accessing stored on-base-unit and off-base-unit line currents;

determining if the cordless handset is positioned on the base unit based on a comparison of the stored on-base-unit and off-base-unit line currents to the line current measurements generated by measuring the current flow through the communication line connecting the base unit to the communication network, the communication line comprising of a rear pair and a middle pair, and wherein determining if the cordless handset is positioned on the base unit further includes:

measuring the rear pair current;

determining if the rear pair current is within a pre-defined range of the on-base-unit line current;

in response to determining that the rear pair current is within a predefined range of the on-base-unit line current, setting a flag to indicate that the handset is in contact with the base unit; and in response to determining that the rear pair current is not within a predefined range of the on-base-unit line current, measuring the middle pair current;

determining if the middle air current is within a predefined ran e of the on-base-unit line current;

in response to determining that the middle pair current is within a predefined range of the on-base-unit line current, setting the flag to indicate that the handset is in contact with the base unit; and in response to determining that the handset is in contact with the base unit, proceeding with a desired task.

2. The method according to claim 1, wherein initializing a dataset includes:

measuring an on-base-unit and an off-base-unit line current; and storing the measured on-base-unit and off-base-unit line currents.

3. The method according to claim 1, further including, in response to determining that both the rear pair current and the middle pair current are not within a predefined range of the on-base-unit line current, setting a flag to indicate that the handset is not in contact with the base unit.

4. The method according to claim 1, wherein proceeding with the desired task includes checking a guest out of a hotel.

5. The method according to claim 1, wherein proceeding with the desired task includes checking a patient out of a hospital.

6. A system for sensing a physical position of a cordless handset with respect to a base unit, said system comprising:

a memory;

an input/output (I/O) unit configured to communicate with a communications network; and a processing unit in communication with said memory, I/O unit, and configured to:

initialize a dataset of measured line currents, the dataset of measured line currents comprising line current measurements generated by measuring a current flow through a communication line connecting the base station to a communication network;

receive a line extension number for use in determining the position of an associated cordless handset;

access stored on-base-unit and off-base-unit line currents;

determine if the cordless handset is positioned on the base unit based on a comparison of the stored on-base-unit and off-base-unit line currents to the line current measurements generated by measuring the current flow through the communication line connecting the base unit to the communication network, the communication line comprising of a rear pair and a middle pair, and wherein determining if the cordless handset is positioned on the base unit further includes:

measuring the rear pair current;

determining if the rear pair current is within a pre-defined range of the on-base-unit line current;

in response to determining that the rear pair current is within a predefined range of the on-base-unit line current, setting a flag to indicate that the handset is in contact with the base unit; and in response to determining that the rear pair current is not within a predefined range of the on-base-unit line current, measuring the middle pair current;

determining if the middle pair current is within a predefined range of the on-base-unit line current;

in response to determining that the middle pair current is within a predefined range of the on-base-unit line current, setting the flag to indicate that the handset is in contact with the base unit; and in response to determining that the handset is in contact with the base unit, proceeding with a desired task.

7. The system according to claim 6, wherein in initializing a dataset, the processing unit is further configured to:

measure an on-base-unit and an off-base-unit line current; and store the measured on-base-unit and off-base-unit line currents.

8. The system according to claim 6, further configured to, in response to determining that both the rear pair current and the middle pair current are not within a predefined range of the on-base-unit line current, set a flag to indicate that the handset is not in contact with the base unit.

9. The system according to claim 6, wherein in proceeding with the desired task, the processing unit is further configured to include checking a guest out of a hotel.

10. The system according to claim 6, wherein in proceeding with the desired task, the processing unit is further configured to include checking a patient out of a hospital.

* * * * *